Sept. 23, 1969    G. KEMPF    3,469,097
METHOD AND DEVICE FOR CORRECTING AXIAL ASTIGMATISM OF
CORPUSCULAR-RAY-OPTICAL LENSES
Filed Sept. 26, 1966    4 Sheets-Sheet 3

# United States Patent Office

3,469,097
Patented Sept. 23, 1969

3,469,097
METHOD AND DEVICE FOR CORRECTING AXIAL ASTIGMATISM OF CORPUSCULAR-RAY-OPTICAL LENSES
Gerhard Kempf, Berlin, Germany, assignor to Siemens Aktiengesellschaft, Munich, Germany, a corporation of Germany
Filed Sept. 26, 1966, Ser. No. 581,981
Claims priority, application Germany, Sept. 28, 1965, S 99,779
Int. Cl. H01j 37/26
U.S. Cl. 250—49.5                              8 Claims

ABSTRACT OF THE DISCLOSURE

For correcting axial astigmatism of electron-optical and other corpuscular-ray lenses having an adjustable stigmator an object having edges is placed into the ray path between the lens plane and the caustic point at the image side of the lens, the object being disposed so as to have its edges lying in a plane perpendicular to the ray axis. Shadow images are then formed of the edges of the object. The adjustment of the stigmator is varied while observing the images until the images occupy a predetermined positional relation to a reference axis perpendicular to the images of the respective edges.

---

My invention relates to method and means for correcting axial astigmatism of corpuscular-ray-optical, particularly electron-optical lenses.

It is known to provide such electromagnetic or electrostatic lenses with a device, the so-called stigmator, for correction of axial astigmatism. As a rule, the criterion for occurrence of axial astigmatism and hence for adjusting the stigmator is constituted by the directional dependence of the Fresnel scattering phenomena at the contrast boundaries of a slightly defocussed image produced by a specimen or other object (for example, the diffraction marginal bands at the hole edges of a perforated foil), or, in the case of projection and condenser lenses, a double symmetry of a caustic cross section or surface of the particular lens. The "caustic" cross section or surface is defined, for example, in "Handbook of Physics" by E. U. Condon and H. Odishaw, McGraw-Hill Book Co., N.Y., 1958, pages 6–26, under the heading "Laws of Image Formation." Using these two criteria requires applying a high subsequent magnification and therefore the presence of further corpuscular-ray lenses in the ray path following the lens to be corrected. However, there are devices, particularly those operating with a microprobe for X-ray microanalyses, that have lenses only above the specimen and do not permit a corpuscular-ray optical enlargement. In such analyzing equipment, incidentally, the above-mentioned diffraction edge may also be formed by a displaceable specimen holder or supporting table.

It is an object of my invention to devise methods and means for the correction of astigmatism that do not require magnification by corpuscular-ray lenses other than the one to be corrected.

To this end, and in accordance with my invention, I place one or more objects into the corpuscular-ray path between the plane of the lens to be corrected and the caustic point at the image side of the lens; and I produce shadow images of edges formed by these objects, said edges lying in a plane extending perpendicular to the ray axis. I then adjust the stigmator of the lens while observing these shadow images, until the shadow images occupy a predetermined positional relation, preferably a symmetrical relation, to a reference axis perpendicular to the image of the edge being observed.

My invention is predicated upon the fact that the shadow image of an object placed into the caustic range of a lens depends upon the geometric shape of the caustic, which shape is dependent not only upon the aperture defect of the particular lens but also to an appreciable degree upon any astigmatism of this lens. It is possible, therefore, to draw a conclustion as to the correct setting of the stigmator from the appearance of the shadow image of the object placed into the caustic range. Accordingly, this affords varying the adjustment of the stigmator while observing the shadow image, until an adjustment is reached at which the effect of the stigmator upon the correction of astigmatism exhibits its maximum.

According to another feature of my invention, the correcting method is performed by producing sequentialy or in an alternating sequence the respective shadow images of two edges forming with each other an angle $\varphi$ satisfying the condition $0 \neq \varphi \neq 90°$. This affords the assurance that the adjustment of the stigmator will be optimal for astigmatism in any direction, as contrasted to the fact, when using the image of only a single straight edge, an astigmatism extending in the direction of the edge used for producing the shadow image will not be detected or corrected. Any astigmatism becomes particularly evident in the shadow image and accordingly can be compensated with best accuracy by corresponding setting of the stigmator if the angle between the two edges amounts to $\varphi = 45°$.

It has been found preferable in a device according to the invention to give the objects in the caustic range two straight edges of the knife-edge type and to have the knife edges preferably form an angle of 45° or approximately 45°.

According to another feature of my invention, I prefer forming the two edges on an object which is displaceable on a holder in a plane perpendicular to the ray axis in such a manner that selectively one or the other edge will be placed into the ray path. The holder is preferably given a selective third position in which neither of the two edges is located in the ray path so that the investigation proper of the specimen can be carried out, for example an X-ray microanalysis if the apparatus is an analyzer of this type.

For correction of astigmatism in respectively different directions by simple means and in an accurate manner, in accordance with the two coordinately produced shadow images, it is preferable to employ a stigmator of the type, known as such, in which two magnet-coil or electrode systems are connected to respective current or voltage-adjusting means, the two coil or electrode systems being angularly displaced from each other by the above-mentioned angle $\varphi$, preferably of 45°. The stigmator may also c nsist of respective systems which are mechanically displaceable relative to each other, so that a conjoint rotation of several coil or electrode pairs about the ray results in changing the direction of the correcting stigmator field, whereas an angular displacement of the pairs relative to each other changes the field intensity. The correcting method is simpler when using the first-mentioned stigmator having properly adjusted edges and in which the two components of astigmatism can be compensated independently of each other with reference to one of the two respective shadow images so that a transfer from one to the other shadow image is required only once.

The invention will be further described with reference to the accompanying drawings in which:

FIG. 1 illustrates schematically the ray path of an objective lens to be corrected; and FIG. 1a is a schematic view onto FIG. 1 from below, representing an image produced.

FIG. 2 corresponds to FIG. 1a and relates to a shadow image produced in the event of axial astigmatism.

Figure 1:
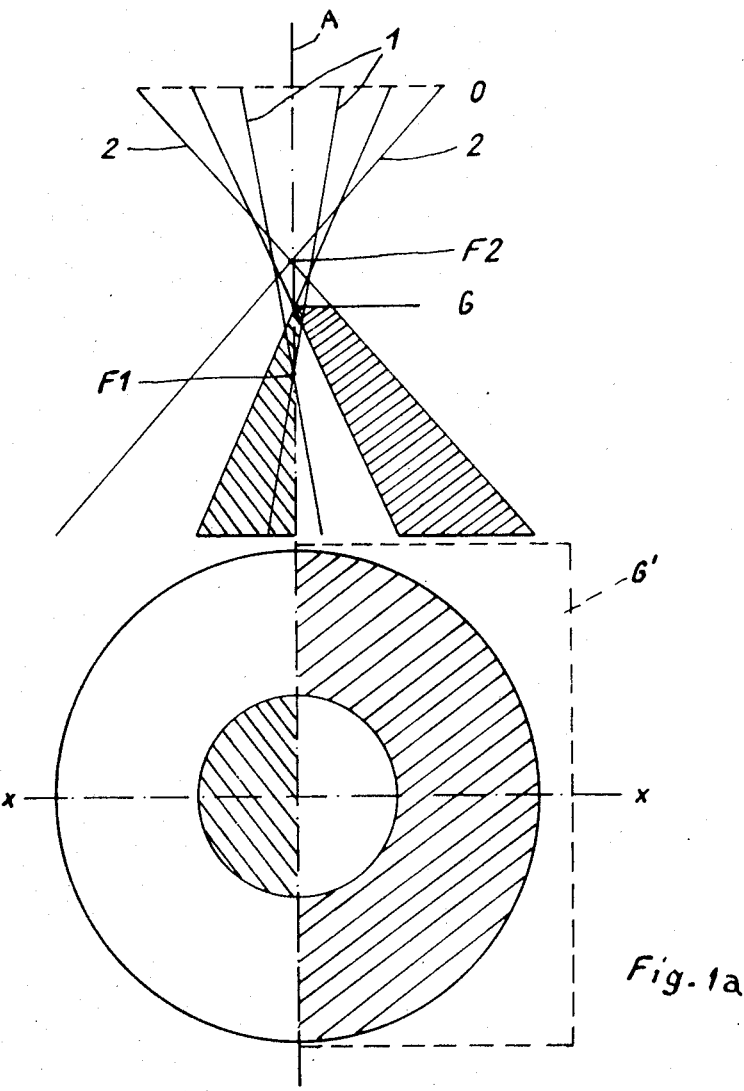

FIG. 1 represents the ray path of an objective lens to be corrected of which only the lens plane O is indicated by a broken line. The lens axis is denoted by A. The aperture defect (spherical aberration) of the lens has the effect that the rays 1 near the axis are less refracted than the rays 2 remote from the axis so that the focal point F1 of the rays close to the axis is located behind the focal point F2 of the rays 2 remote from the axis, seen from the lens plane O. More accurately, there results a kind of focal distance for the different rays. This phenomenon caused by aperture defects of the lens O has the consequence that an object G placed into the caustic range of the lens will shade the hatched regions from the corpuscular beam. Since the lens is rotationally symmetrical, the shaded regions shown in FIG. 1a will result, for example in form of a shadow image on a luminescent image screen. It is presumed that the object G will extend over one-half of the beam cross section as is indicated in FIG. 1a by the projection G′ of the object G.

Figure 2:
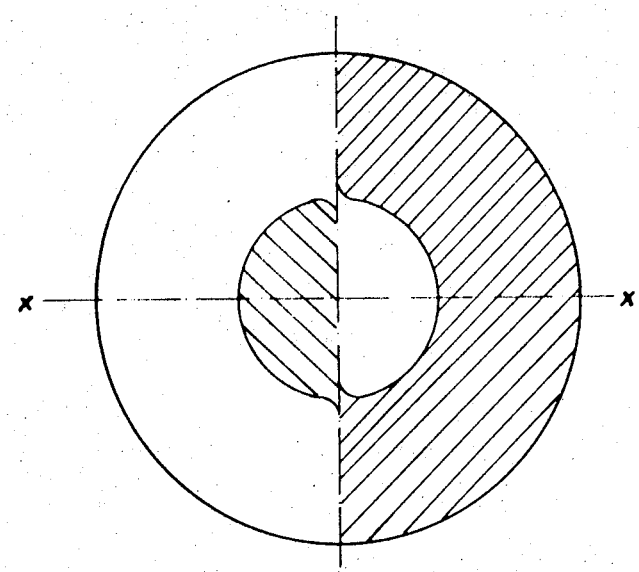

The illustration in FIG. 1a thus represents the shadow image in the event the lens is affected only by an aperture defect but is free of axial astigmatism. The corresponding shadow image in the event of axial astigmatism is schematically represented in FIG. 2. It will be seen that, relative to the axis x—x, there exists asymmetry not observed with a lens free of astigmatism according to FIG. 1a. This asymmetrical image, thereof, is a measure of the amount of astigmatism; and a further step of the method according to the invention resides in observing the shadow image according to FIG. 2 and to simultaneously change the adjustment of the stigmator until a symmetrical shadow image according to FIG. 1 is at least approximately obtained.

Figure 3:
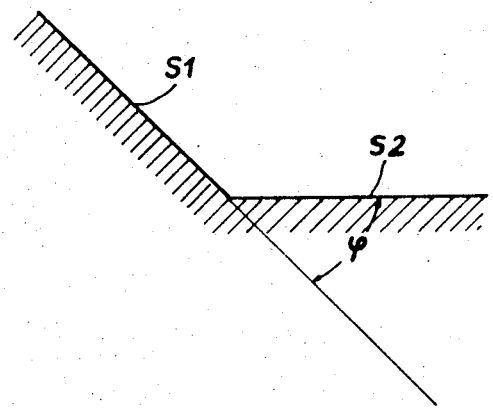
FIG. 3 represents schematically two angularly related edges of an object placed according to the invention between the lens and the image into the area between the lens plane and the caustic point.

The method is preferably performed by employing as testing object G a structure possessing two blade or knife edges S1 and S2 whose edges define an angle $\varphi$ different from 0° and from 90°. In the embodiment schematically illustrated in FIG. 3, the angle $\varphi = 45°$, which has been found to be optimal. The knife edges S1 and S2 are placed successively or in a periodic sequence into the ray path, so that, with the aid of the successively resulting shadow images, the components of the astigmatism in respectively different directions can be eliminated.

Within this method of the invention a subsequent magnification is superfluous so that the method is applicable also with lenses that are not followed in the ray path by a magnifying lens. However, the method is also applicable if subsequent magnifying lenses are present in which case, however, care must be taken that the image configuration according to FIGS. 1a and 2 can still be observed on the luminescence screen. This requires operating with moderate subsequent magnification.

In the latter case, the edge of the object used for forming the shadow image may be placed as close as feasible to the caustic point because then the image circle becomes smaller. Such proximity of the edge to the caustic point, however, is limited by the required sharpness of the focal point. In other words, the image circle must remain sufficiently sharp to permit satisfactory observation.

In principle, the astigmatism of slanting beams can also be corrected in any given beam direction. The edges may also be formed by the generatrix lines of a thin wire.

The invention can further be caried out by using curved edges. In some case of this kind, the criteria for elimination of astigmatism may be based upon an image configuration other than symmetry of the image.

A device for correcting astigmatism in accordance with the invention will now be described with reference to an objective lens equipped with a stigmator of the kind described in the copending application of M. von Rauch, Ser. No. 442,389, filed Mar. 24, 1965, assigned to the assignee of the present invention.

Figure 4:
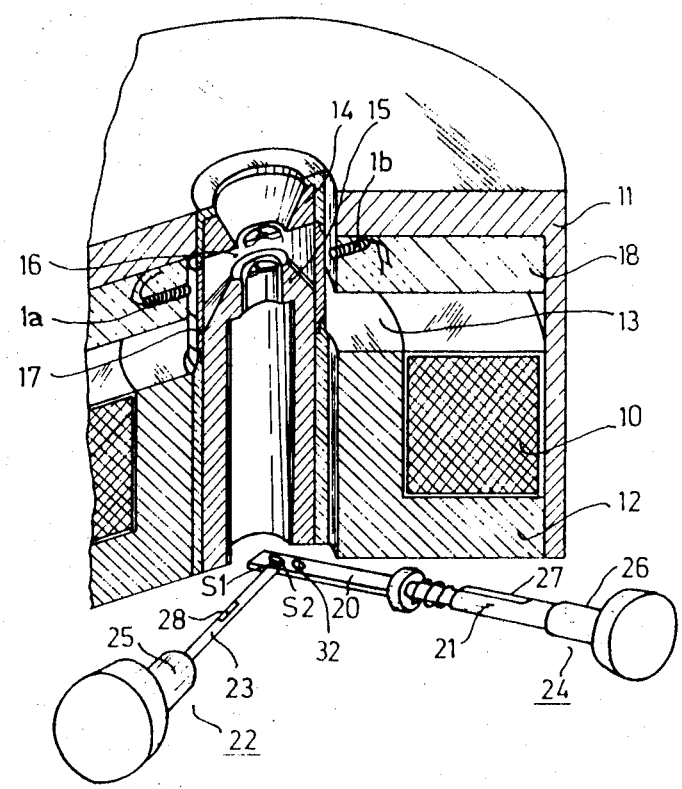
FIG. 4 illustrates in schematic perspective and partly in section an objective lens equipped with a stigmator and a holder for the edge-forming object.

Referring to FIG. 4 of the accompanying drawings there is shown the objective lens of an electron microscope. The lens is of the magnetic type and accordingly is provided with a winding 10 for producing the magnetic lens field. The winding 10 is mounted on a ferromagnetic structure 12 and coaxially surrounds the beam axis of the device. The structure 12 is joined with a housing and yoke structure 11, which like the structure 12 consists of ferromagnetic material of high permeability to carry the magnetic flux produced by the coil 10. A gap 13 between structures 11 and 12 forces the magnetic flux to pass into the two pole shoes 13 and 15 of the lens and to extend through the lens gap 16 between the two pole shoes where the magnetic field forms the effective lens proper. The two pole shoes are joined together with the structures 11 and 12 by a cylindrical insert 17 of non-magnetic material such as brass. The electron beam is optically influenced within the range of the lens gap 16 by the magnetic field.

The illustrated lens is provided with a stigmator for correcting astigmatism. The stigmator comprises two systems each composed of four magnet coils of which only two are visible in FIG. 4 and denoted by 1a and 1b. The coils are embedded in a structure 18 of casting resin.

Figure 5:
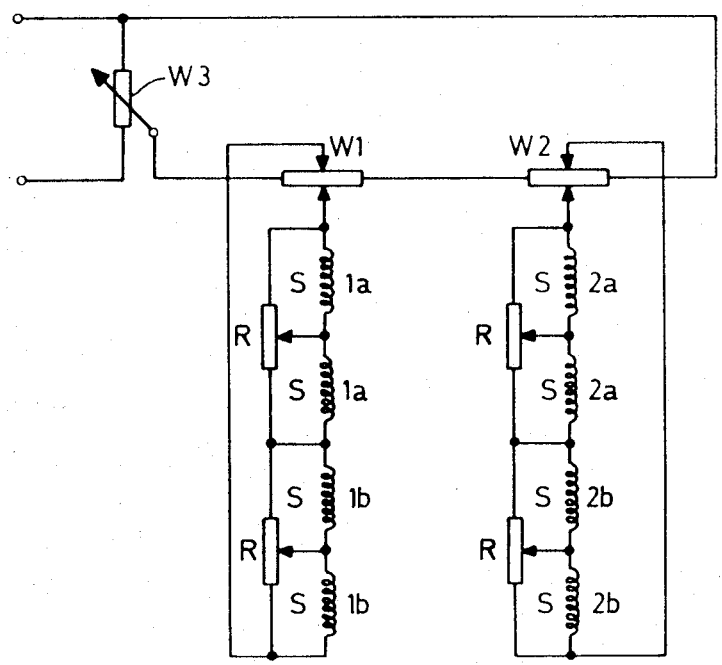
FIG. 5 is an electric circuit diagram of the stigmator coils.
Figure 6:
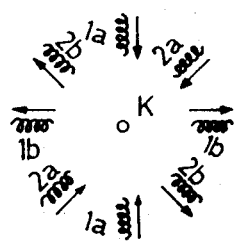
FIG. 6 is an explanatory diagram showing the angular distribution of the stigmator coils in the device according to FIG. 4.

As shown in FIG. 6, the beam K is surrounded by the eight coils of the stigmator which are arranged in four pairs of oppositely located coils such as 1a—1a or 2b—2b. The coil pairs are angularly spaced equal amounts from each other. The eight coils, denoted by S in FIG. 5, are electrically arranged in two systems, each comprising four individual coils of which each two are located opposite each other according to FIG. 6. One of the systems comprises the coils 1a and 1b. The other system comprises the coils 2a and 2b. The angle between two adjacent coils according to FIG. 6 is 45° which corresponds to the preferred embodiment of the angle $\phi$ between the two edges of the object used for correction of astigmatism.

According to FIG. 5, each of the two coil systems S is energized through a potentiometric resistor W1 or W2. By shifting the taps of these resistors, the two coil systems can be energized differently from each other so that the direction of the resultant stigmator field is changed. Independently of the selected settting of the correcting field direction by means of the resistors W1 and W2, the ratio of the voltages supplied to each two mutually opposite stigmator coils, this ratio being set by respective potentiometers R, remains constant. For that reason, the field axis of the correction field produced by the stigmator and positionally determined by this voltage ratio, retains its position and consequently is independent of the adjustable direction of the correction field.

The intensity of the correction field is adjustable by means of another potentiometer rheostat W3. This intensity can be adjusted independently of the selected settings at resistors W1, W2 and at the potentiometers R.

Figure 7:
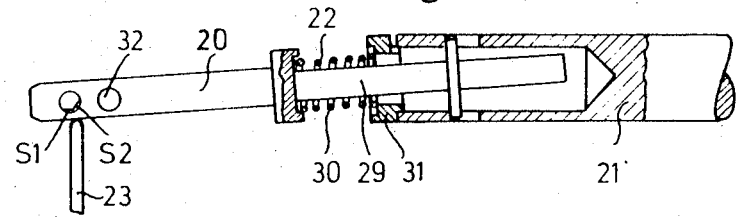
FIG. 7 illustrates partly in section a detail of the holder for the object to be placed into the ray path for adjusting the stigmator.

Shown in FIG. 4 beneath the objective lens is a holder for the object possessing the two edges S1 and S2. The object is essentially a displaceable diaphragm 20 which is slidably mounted in a sleeve 21 (FIGS. 4, 7). The slider 20 is biased by a spring 30 and can be displaced angularly in a direction transverse to its axis by means of a tappet 23 actuable with the aid of a drive 22. By operating the drives 22 and 24, one of the edges S1 and S2 can be selectively placed into the ray path. The diaphragm slider 20 further possesses a free opening 32 so that by corresponding actuation of the drive 24, both edges S1 and S2 can be moved out of the ray path which will then freely pass through the opening 32.

The drives 22 and 24 have sleeve portions 25 and 26 vacuum-tightly inserted into the evacuated housing of the electron microscope so that the appertaining knobs are accessible from the outside. The sleeve portions are internally threaded to cooperate with a counter thread on the tappet 23 or with the corresponding sleeve-shaped portion 21. Rotation of the drives 22 and 24 causes longitudinal shifting of the respective parts 21 and 23 since the latter are prevented from rotation by a flattened or other suitable profile engaging corresponding stationary parts of the microscope. The flattened portions are denoted by 27 and 28 respectively.

As will be seen from FIG. 7, the diaphragm slider 20 has an extension 29 on which the above-mentioned spring 30 is seated, this spring being a helical compression spring. The spring abuts against an inclined ring-shaped abutment 31 so that the longitudinal axis of the diaphragm slider 20 and its extension 29 is inclined to the axis of the sleeve 21. For that reason, the left-hand end of the slider 20 is elastically placed into engagement with the tappet 23 so that the position of the slider 20 and consequently the position of the edges S1 and S2 relative to the vertical direction with respect to FIG. 7 is determined by the adjustment of the tappet 23. The adjustment of the diaphragm slider 20 in a direction substantially perpendicular to the displacement of the tappet 23 is effected by means of the sleeve 21 actuated by the drive 24. During adjustment in the latter direction, the diaphragm slider 20 glides over the rounded top of the tappet 23. It will be recognized from a comparison of FIG. 7 with FIG. 4 that the axial direction of the electron beam is perpendicular to the plane of illustration in FIG. 7.

Upon a study of this disclosure, it will be obvious to those skilled in the art that my invention permits of various modifications and may be given embodiments other than illustrated and described herein, without departing from the essential features of the invention and within the scope of the claims annexed hereto.

I claim:

1. The method of correcting axial astigmatism of electron-optical and other corpuscular-ray lenses having an adjustable stigmator, which comprises placing an object having edges into the ray path between the lens plane and the caustic point at the image side of the lens, forming respective shadow images of edges of said object, said edges lying in a plane perpendicular to the ray axis and varying the adjustment of the stigmator while observing said images until said images occupy a predetermined positional relation to a reference axis perpendicular to the images of the respective edges.

2. The method acocrding to claim 1, wherein said edges are straight and said stigmator adjustment is varied until said images of said edges occupy symmetrical positions relative to said reference axis.

3. The method according to claim 2, wherein said object has two edges defining conjointly an angle larger than 0° and smaller than 90°.

4. The method according to claim 3, wherein said angle is about 45°.

5. With a corpuscular-ray lens having an adjustable stigmator for correction of axial astigmatism, in combination, a device for determining optimal adjustment of said stigmator, said device comprising a structure which forms an object with edges extending substantially in an object plane perpendicular to the lens axis and located between the lens plane and the caustic point at the image side of the lens, said structure being displaceable in said object plane so as to permit placing said edges into and out of the ray path of the lens for producing shadow images of said edges when said edges are placed into said path, whereby adjustment of said stigmator to a given positional relation of said images to a reference axis perpendicular to the images of the respective edges corresponds to optimal corection of astigmatism.

6. A device according to claim 5, said structure having two of said edges, said two edges defining together an acute angle, and said structure being displaceable between two positions to selectively place one of said edges into said ray path.

7. In a device according to claim 6, said structure having a selective third position in which both said edges are removed from said ray path.

8. In a device according to claim 6, said stigmator having two field systems distributed about the lens axis and angularly spaced from each other an amount equal to said acute angle.

References Cited

UNITED STATES PATENTS 2,973,433   2/1961   Kramer.
3,156,820   11/1964  Reimer.

OTHER REFERENCES

"Journal of Applied Physics," vol. 17, No. 6, 1946, pages 411–419.

RALPH G. NILSON, Primary Examiner

A. L. BIRCH, Assistant Examiner

U.S. Cl. X.R.

335—210